Sept. 2, 1958 W. LASAR 2,850,055
MEAT SAWING DEVICE HAVING REMOVABLE STATIONARY TABLE
Filed July 2, 1954 2 Sheets-Sheet 1
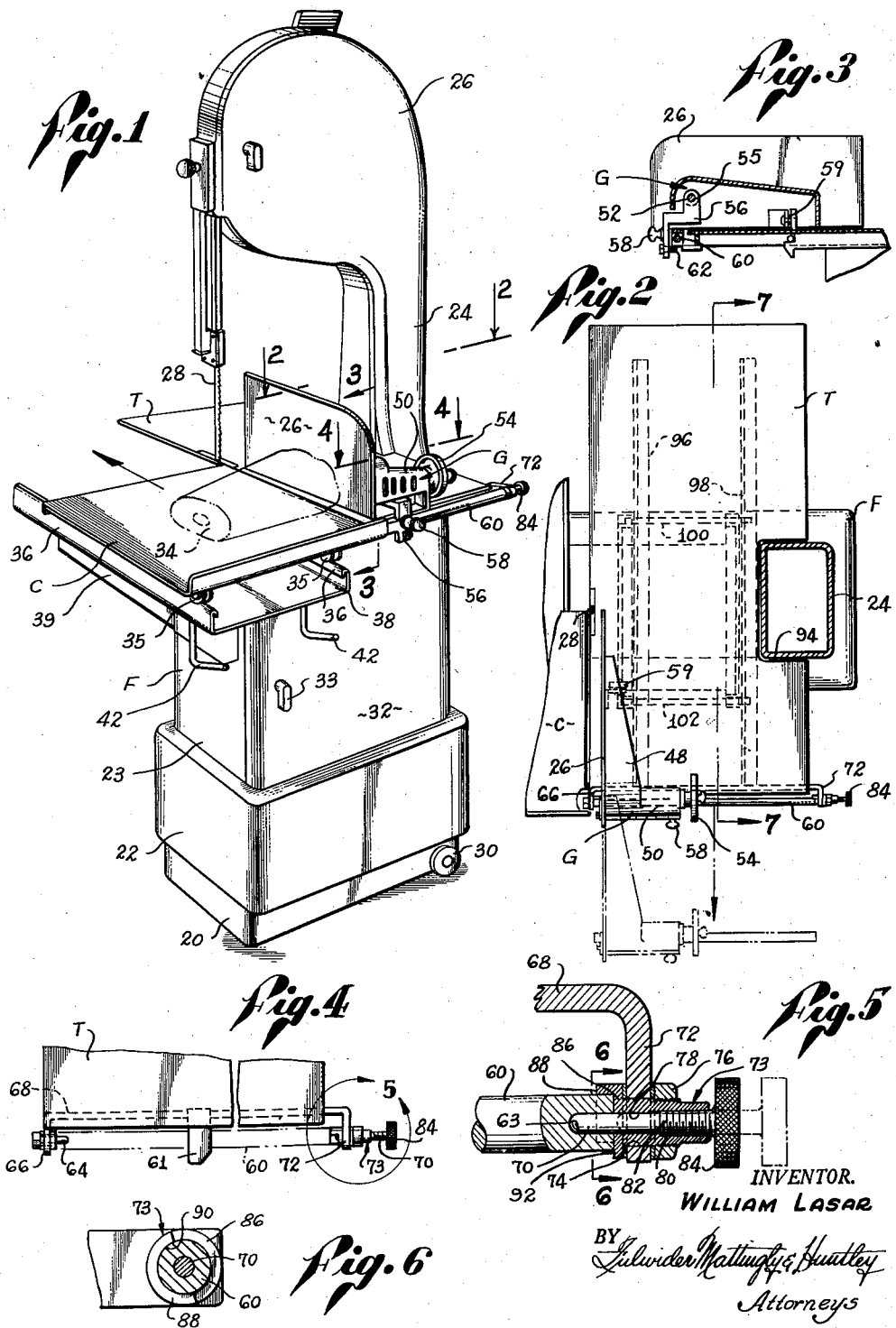

Sept. 2, 1958 W. LASAR 2,850,055
MEAT SAWING DEVICE HAVING REMOVABLE STATIONARY TABLE
Filed July 2, 1954 2 Sheets-Sheet 2
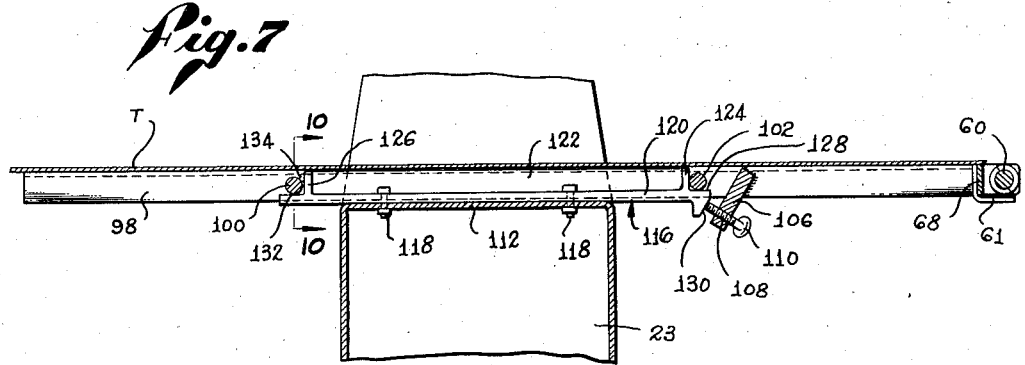
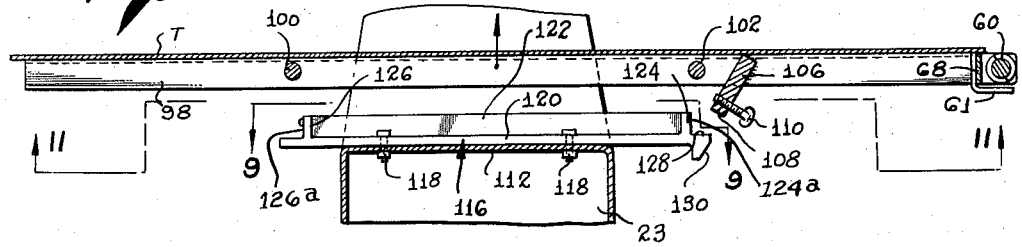
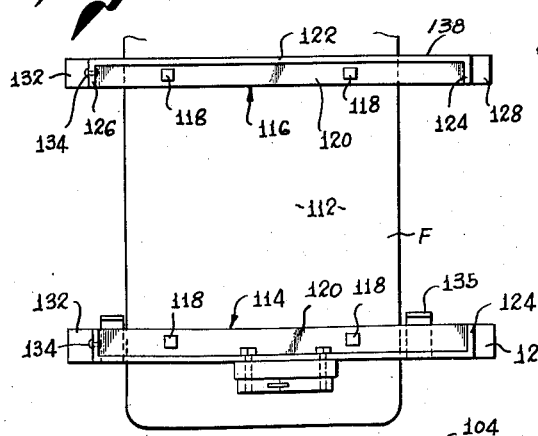
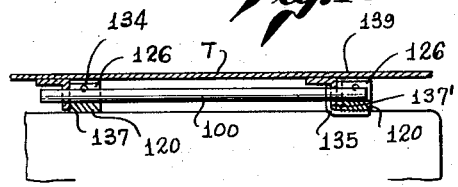
INVENTOR.
WILLIAM LASAR
BY Fulwider Mattingly & Huntley
Attorneys United States Patent Office 2,850,055
Patented Sept. 2, 1958

2,850,055

MEAT SAWING DEVICE HAVING REMOVABLE STATIONARY TABLE

William Lasar, Downey, Calif.

Application July 2, 1954, Serial No. 441,068

4 Claims. (Cl. 143—132)

The present invention relates generally to the field of butchering and more particularly to a novel meat sawing device of the band saw type.

The band saw type of meat sawing device is widely used in butchering since it permits rapid and efficient cutting of meat, fish and bone. A serious problem in the use of such devices is that of maintaining them in a sanitary condition. It is essential that each part of the device that is likely to come into contact with the meat be thoroughly cleaned at least once each working day in order to safeguard against any possible contamination of such meat. With the heretofore-proposed meat sawing devices considerable time and effort is required in order to effect a thorough cleaning job. This is primarily true because in such devices the stationary table thereof is rigidly fixed to its frame thereby making the various parts of such devices difficult of access.

It is a major object of the present invention to provide a novel and improved meat sawing device having a readily removable stationary table.

A further object of the invention is to provide a device of the aforedescribed nature having a removable stationary table that automatically registers with the frame of the device whereby no misalignment can take place between the frame and the table. This is an important advantage since such misalignment can result in malfunction of the device and breakage of its band saw.

Another object is to provide a device of the aforedescribed nature wherein the stationary table although removable from the frame is completely rigid when mounted in place thereon.

An additional object is to provide a meat sawing device which is simple of design and rugged of construction whereby it may afford a long and trouble-free service life.

Yet another object of the present invention is to provide a meat sawing device having a thickness gauge which is readily removable from the frame of the device.

A further object is to provide a meat sawing device of the aforedescribed nature wherein both the stationary table and the thickness gauge thereof may be easily and quickly removed without the use of any tools even by an unskilled worker.

These and other objects and advantages of the present invention will become apparent from the following detailed description, when taken in conjunction with the appended drawings wherein:

Figure 1 is a perspective view of a meat sawing device embodying the present invention;

Figure 2 is a horizontal sectional view taken along line 2—2 of Figure 1;

Figure 3 is a vertical sectional view taken along line 3—3 of Figure 1;

Figure 4 is an enlarged fragmentary horizontal sectional view taken along line 4—4 of Figure 1;

Figure 5 is an enlarged view taken in horizontal section within the encircled area designated 5 in Figure 4;

Figure 6 is a vertical sectional view taken along line 6—6 of Figure 5;

Figure 7 is an enlarged vertical sectional view taken along line 7—7 of Figure 2;

Figure 8 is a view similar to Figure 7 but showing the stationary table of the device being removed from the frame thereof;

Figure 9 is a horizontal sectional view taken along line 9—9 of Figure 8;

Figure 10 is a vertical sectional view taken along line 10—10 of Figure 7; and,

Figure 11 is a view showing the underside of the removable stationary table of the device taken along line 11—11 of Figure 8.

Referring to the drawings, the preferred form of meat sawing device embodying the present invention includes a frame F having a wheeled base 20 formed so as to provide a hollow motor housing 22 and a lower pulley chamber 23. A head 24 extends upwardly from the top of the motor housing and defines an upper pulley chamber 26. A band saw blade 28 is carried between upper and lower pulleys (not shown) mounted within these chambers. The upper portion of the motor housing 22 supports a movable meat-carrying table C and a removable stationary table T at the same elevation. One end of the stationary table T removably mounts a thickness gauge G for controlling the width of cut of the meat being sawed. The side of the meat-carrying table C adjacent the removable table T is horizontally spaced from the latter to provide clearance for the band saw blade 28. In the operation of the preferred form of meat sawing device, the major portion of a piece of meat 34 to be cut is positioned upon the meat-carrying table C with the end to be cut from the main portion of meat extending onto the stationary table T in abutment with the upstanding gauge plate 26 of the thickness gauge G. The meat-carrying table C is then urged from its position of Figure 1 in the direction of the arrow so as to cause the saw blade 24 to cut a slice of meat off the main portion thereof.

More particularly, and with reference to Figure 1, the frame base 20 is generally rectangular in configuration and mounts a pair of wheels 30 (only one of which is shown) in order to facilitate moving it from one place to another. A door 32 having a handle 33 is incorporated in the lower pulley chamber 23. The meat-carrying table C is supported by rollers 35 which rotate upon and are guided by a pair of horizontal tracks 36 formed on the edges of a plate 38 that is rigidly secured to the frame base 20 by a support 39. A pair of aligned generally L-shaped holders 42 depend from the front portion of the plate 38 for a purpose to be set forth hereinafter.

Referring now to Figures 2 through 6, the thickness gauge G may be of the same general type disclosed in United States Letters Patent No. 2,380,700, issued to me July 31, 1945, and entitled Meat Cutting Machines. This thickness gauge includes the vertically extending gauge plate 26 which is disposed in parallelism to the left edge of the stationary table T. The gauge plate 26 is integrally connected by means of a bracket 48 to a hollow body 50 which carries an adjusting screw 52 that is keyed to a handwheel 54. The threads of the adjusting screw 52 are engaged with a threaded bore 55 of a measuring arm member 56, as shown in Figure 3. The measuring arm member 56 carries a horizontally extending set screw 58. A roller 59 is rotatably mounted on the gauge plate 26 at a point spaced rearwardly from the hollow body 50.

The measuring arm member 56 is arranged to be freely horizontally slidable along a slide rod 60 towards and away from the left edge of the stationary table T. Tightening of the set screw 58, however, serves to restrain such movement. When the set screw 58 is loosened, rotation of the adjusting screw 52 by means of the handwheel 54 will move the gauge plate 26 towards and away from the left edge of the stationary table T so as to control the width of cut of the meat to be sawed. Unrestricted movement of the measuring arm member 56 away from the left edge of the stationary table is prevented by means of a stop element 61 formed on the mid-portion of the table, which stop element is engaged by a bolt 62 carried by the arm member 56. The stop element 61 is shown in Figures 4, 8 and 11, and the bolt 62 is shown in Figure 3.

Is should be particularly noted that the slide rod 60 and hence the thickness gauge assembly is readily disengageable from the front of the stationary table T. This is an important feature since it is necessary when handling the larger cuts of meat that the top of the stationary table be cleared of all obstructions. The ready removability of the thickness gauge also permits it to be thoroughly cleaned with a minimum of time and effort. In order that it may be easily removed from table T, the slide rod 60 is formed at each of its ends with a coaxial cavity 63, as shown in Figure 5. These cavities 63 are adapted to be received between a fixed pin 64 mounted by the left leg 66 of a U-shaped bracket 68, and an axially movable release pin 70 mounted by the opposite leg 72 thereof. The bracket 68 is fixedly secured to the front portion of the stationary table T, as by welding. The release pin 70 is carried by a generally cylindrical socket 73 that is secured within a bore 74 formed in the bracket leg 72 by a nut 76, as shown in Figure 5. The socket 72 is formed with a coaxial bore 78, one portion 80 of which is threaded. The release pin 70 includes a threaded section 82 that engages the threaded portion 80 of bore 78 in order that rotation of the pin within said bore will effect its axial movement towards and away from the right end of the slide rod 60. A knurled knob 84 is integrally formed at the right end of the release pin 70 to facilitate its rotation. The left portion of the socket 72 is formed with a saddle element 86 having a coaxial axially extending semi-circular lip 88 that faces the fixed pin 64. The inner periphery 90 of this lip 88 substantially conforms to the outside diameter of the slide rod 60, as indicated in Figure 6.

Referring to Figures 2, 4, 5 and 6, in order to remove the slide rod 60 from the stationary table T, the knob 84 is rotated until the left end of the release pin 70 clears the vertical surface 92 of the saddle element 86, as indicated by the dotted lines in Figure 5. The slide rod 60 will then be free for removal, however, it will not inadvertently fall because of the support afforded by the lower portion of the saddle element's lip 88, as indicated in Figure 6. To remove the slide rod 60 and the attached thickness gauge G, the operator, using but one of his hands, may pull the right end of the slide rod forwardly and upwardly out of the confines of the saddle element 86. Once the right end of the rod 60 has been so removed from the saddle element 86 the entire assembly may be urged to the right whereby the cavity formed in the left end of the slide rod will clear the fixed pin 64 and the assembly may be pulled forwardly away from the table T, as shown in dotted outline in Figure 2. The slide rod may then be hung on the holders 42 depending from the plate 38, in which position the thickness gauge G will not obstruct further meat sawing operations.

Referring now to Figures 2 and 7 through 11, the stationary table T is generally rectangular in plan view and includes a cut-out portion 94 for receiving the bottom of the head 24. A pair of parallel, longitudinally extending stiffeners 96 and 98 rigidly depend from the underside of the table T, which stiffeners may be generally L-shaped in cross-section. A pair of parallel bars 100 and 102 bridge the stiffeners, the tops of these bars being spaced a short distance below the underside of the table T. A pair of diagonally inclined legs 104 and 106 extend downwardly and rearwardly from the underside of the table T adjacent bars 100 and 102, said legs being rigidly secured thereto, as by welding. Each of these legs 104 and 106 are formed with a rearwardly and upwardly inclined threaded bore 108 for receiving a thumb screw 110.

As shown in Figure 7, the upper wall 112 of the lower pulley chamber 23 rigidly mounts a pair of horizontally extending, elongated support members 114 and 116 as by bolts and nut combinations 118. These support members are in alignment and they extend parallel to the tracks 36 of the meat-carrying table C. Each of these support members include a flat bottom element 120 which abuts the top of the wall 112, an upstanding side piece 122, a front end piece 124 and a rear end piece 126. The front end of each bottom element 120 projects forwardly of the front end piece 124 so as to define a horizontal supporting surface 128. Additionally, the front end of the bottom elements extend downwardly so as to define downwardly and rearwardly vertically inclined flat surface 130. The thumb screws 110 are seen to extend at right angles to the latter surface 130. The rear end of each bottom element 120 likewise extends rearwardly of the rear end piece 126 so as to define a horizontal supporting surface 132. Each rear end piece rigidly mounts a rivet 134 at a point spaced above the bottom element. As shown in Figures 9 and 10, the support member 114 includes a pair of spaced-apart generally L-shaped hook elements 135 which are rigidly secured to the underside thereof.

As indicated in Figure 7, the bars 100 of the table T normally rest upon the horizontal supporting surfaces 132 of the support members 114 and 116, respectively, while the bars 102 normally rest upon the horizontal supporting surfaces 128 of those support members. Horizontal movement of the table T in a direction parallel to its stiffeners 96 and 98 is restrained by the abutment of the bars 100 and 102 with the vertical surfaces 124a and 126a of the front and rear end pieces 124 and 126 of the support members 114 and 116. Horizontal movement of the table T in a direction normal to its stiffeners 96 and 98 is restrained by the abutment of the vertical surface 137 of the stiffener 98 with the vertical surface 138 of the side piece 122 of support member 116 and of the vertical surface 137' of the stiffener 96 with the vertical surfaces 139 of the hook elements 135, as indicated in Figure 10. The table is restrained from tilting in a vertical plane by the engagement of the bar 100 with the rivets 134 and the engagement of the threaded end of the thumb screws 110 with the vertically inclined surfaces 130 of the support members 114 and 116, such engagement causing the bar 100 to be locked between the rivets 134 and the horizontal supporting surfaces 132.

Referring now to Figure 8, in order to remove the table T from the frame F it is only necessary to back off the thumb screws 110. The table may then be raised vertically from the support members 114 and 116. To replace the table the reverse of this procedure is followed. Referring again to Figure 7, it should be observed that the table T will remain locked to the support members 114 and 116 even though a downwardly directed force is applied to any point thereon. Hence, even if a large cut of meat were placed on the right side thereof, the rivets 134 would prevent any tilting of the table. It should likewise be noted that the table will automatically assume its correct alignment relative to the frame, and hence the saw blade 28 and meat carrying table C when the thumb screws 110 are tightened. Hence, there can be no danger of misalignment of the table even when the device is being operated by a comparatively unskilled workman.

While there has been shown and described hereinbefore what is presently considered to be the preferred embodiment of the present invention, it will be apparent that various modifications and changes may be made thereto without departing from the spirit of the invention or the scope of the following claims.

I claim:

1. A meat sawing device, comprising: a frame having first and second parallel elongated support members disposed in a horizontal plane; a first pair of horizontal supporting surfaces formed on one end of said support members; a second pair of horizontal supporting surfaces formed on the opposite end of said support members; a first pair of vertically extending surfaces formed on said one end of said support members; a second pair of vertically extending surfaces formed on the opposite end of said support members; a horizontal projection formed on the opposite end of each of said support members above said second horizontal supporting surfaces; a pair of vertically inclined surfaces, said surfaces being formed on said one end of each of said support members below its first horizontal supporting surface, said inclined surface extended downwardly and towards the opposite end of its support member; a removable table for use with said frame, said frame and said table being formed with complementary vertical surfaces which when interfitted cooperate to prevent said table from horizontal movement relative to said frame in a direction normal to the longitudinal axis of said support members; first and second parallel bars on said table normal to the longitudinal axis of said support members, said first bar resting upon the first horizontal supporting surfaces of said support members and said second bar resting upon the second horizontal supporting surfaces of said support members with said second bar abutting said second vertically extending surfaces and said second bar also engaging the underside of said horizontal projections; and a pair of thumb screws carried by said table in vertical alignment with said support members, said thumb screws engaging said vertically inclined surface of said support members so as to lock said table against tilting relative to said frame.

2. A meat sawing device, comprising: a frame having first and second parallel elongated support members disposed in a horizontal plane; a first pair of horizontal supporting surfaces formed on one end of said support members; a second pair of horizontal supporting surfaces formed on the opposite end of said support members; a first pair of vertically extending surfaces formed on said one end of said support members; a second pair of vertically extending surfaces formed on the opposite end of said support members; a horizontal projection formed on the opposite end of each of said support members above said second horizontal supporting surfaces; a pair of vertically inclined surfaces, said surfaces being formed on said one end of each of said support members below its first horizontal supporting surface, said inclined surface extended downwardly and towards the opposite end of its support member; a removable table for use with said frame, said frame and said table being formed with complementary vertical surfaces which when interfitted cooperate to prevent said table from horizontal movement relative to said frame in a direction normal to the longitudinal axis of said support members; first and second parallel bars on said table normal to the longitudinal axis of said support members, said first bar resting upon the first horizontal supporting surfaces of said support members and said second bar resting upon the second horizontal supporting surfaces of said support members with said second bar abutting said second vertically extending surfaces and said second bar also engaging the underside of said horizontal projections; leg means depending from said table; and a pair of thumb screws carried by said leg means in vertical alignment with said support members, said thumb screws extending at right angles to and engageable with said vertically inclined surface of said support members so as to lock said table against tilting relative to said frame.

3. A meat sawing device, comprising: a frame having first and second parallel elongated support members disposed in a horizontal plane; a first pair of horizontal supporting surfaces formed on one end of said support members; a second pair of horizontal supporting surfaces formed on the opposite end of said support members; a first pair of vertically extending surfaces formed on said one end of said support members; a second pair of vertically extending surfaces formed on the opposite end of said support members; a horizontal projection formed on the opposite end of each of said support members above said second horizontal supporting surfaces; a pair of vertically inclined surfaces, said surfaces being formed on said one end of each of said support members below its first horizontal supporting surface; said inclined surface extended downwardly and towards the opposite end of its support member; a removable table for use with said frame; a pair of elongated stiffeners having vertical surfaces formed below said table parallel with said support members; a pair of longitudinally spaced-apart hook elements rigidly secured to said first support member, with the vertical surfaces of said stiffeners interfitting in abutting relationship with said hook elements and wtih said second support member so as to cooperate to prevent said table from horizontal movement relative to said frame in a direction normal to the longitudinal axis of said support members; first and second parallel bars extending between said stiffeners and normal to the longitudinal axis of said support members, said first bar resting upon the first horizontal supporting surfaces of said support members and said second bar resting upon the second horizontal supporting surfaces of said support members with said second bar abutting said second vertically extending surfaces and said second bar also engaging the underside of said horizontal projections; and a pair of thumb screws carried by said table in vertical alignment with said support members, said thumb screws engaging with said vertically inclined surface of said support members so as to lock said table against tilting relative to said frame.

4. A meat sawing device, comprising: a frame having first and second parallel elongated support members disposed in a horizontal plane; a first pair of horizontal supporting surfaces formed on one end of said support members; a second pair of horizontal supporting surfaces formed on the opposite end of said support members; a first pair of vertically extending surfaces formed on said one end of said support members; a second pair of vertically extending surfaces formed on the opposite end of said support members; a horizontal projection formed on the opposite end of each of said support members above said second horizontal supporting surfaces; a pair of vertically inclined surfaces, said surfaces being formed on said one end of each of said support members below its first horizontal supporting surface; said inclined surface extended downwardly and towards the opposite end of its support member; a removable table for use with said frame; a pair of elongated stiffeners having vertical surfaces formed below said table parallel with said support members; a pair of longitudinally spaced-apart hook elements rigidly secured to said first support member, with the vertical surfaces of said stiffeners interfitting in abutting relationship with said hook elements and with said second support member so as to cooperate to prevent said table from horizontal movement relative to said frame in a direction normal to the longitudinal axis of said support members; first and second parallel bars extending between said stiffeners and normal to the longitudinal axis of said support members, said first bar resting upon the first horizontal supporting surfaces of said support members and said second bar resting upon the second horizontal supporting surfaces of said support members with said second bar abutting said second vertically extending surfaces and said second bar also engaging the underside of said horizontal projections; leg means depending from said table; and a pair of thumb screws carried by said leg means in vertical alignment with said support members, said thumb screws extending at right angles to and engageable with said vertically inclined surface of said support members so as to lock said table against tilting relative to said frame.

References Cited in the file of this patent

UNITED STATES PATENTS

| | | |
|---|---|---|
| 775,477 | Norlin | Nov. 22, 1904 |
| 1,878,202 | Thomas | Sept. 20, 1932 |
| 1,915,340 | Van Berkel | June 27, 1933 |
| 2,433,600 | Cohen | Dec. 30, 1947 |
| 2,492,824 | Ahrndt et al. | Dec. 27, 1949 |
| 2,585,957 | Meeker et al. | Feb. 19, 1952 |